(12) United States Patent
Park (10) Patent No.: US 12,481,382 B2
(45) Date of Patent: Nov. 25, 2025

(54) DISPLAY DEVICE

(71) Applicant: SAMSUNG DISPLAY CO., LTD., Yongin-si (KR)

(72) Inventor: Wonsang Park, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/321,989

(22) Filed: May 23, 2023

(65) Prior Publication Data

US 2024/0029657 A1    Jan. 25, 2024

(30) Foreign Application Priority Data

Jul. 25, 2022  (KR) .................. 10-2022-0091809

(51) Int. Cl.
| | |
|---|---|
| *G06F 3/041* | (2006.01) |
| *G06F 3/044* | (2006.01) |
| *G06F 3/046* | (2006.01) |
| *G09G 3/3258* | (2016.01) |

(52) U.S. Cl.
CPC ............ *G06F 3/0412* (2013.01); *G06F 3/041* (2013.01); *G06F 3/0416* (2013.01); *G06F 3/044* (2013.01); *G06F 3/0442* (2019.05); *G06F 3/0446* (2019.05); *G06F 3/046* (2013.01); *G09G 3/3258* (2013.01); *G06F 2203/04111* (2013.01)

(58) Field of Classification Search
CPC ...... G06F 3/041; G06F 3/0412; G06F 3/0416; G06F 3/044; G06F 3/0442; G06F 3/0445; G06F 3/046; G09G 3/3258

USPC ........................................................ 345/173
See application file for complete search history.

(56) References Cited

U.S. PATENT DOCUMENTS

| | | | |
|---|---|---|---|
| 9,652,058 B2 | 5/2017 | Watanabe | |
| 10,095,354 B2 | 10/2018 | Ahn | |
| 10,209,846 B2 * | 2/2019 | Wang | G02F 1/133512 |
| 2009/0236151 A1 * | 9/2009 | Yeh | G06F 3/0412 |
| | | | 178/18.03 |
| 2014/0118283 A1 * | 5/2014 | Wang | G06F 3/0443 |
| | | | 345/173 |
| 2016/0209966 A1 | 7/2016 | Jung | |
| 2016/0328047 A1 * | 11/2016 | Jin | G06F 3/04166 |
| 2017/0139525 A1 * | 5/2017 | Jo | G06F 3/041 |
| 2018/0074623 A1 * | 3/2018 | Xi | G06F 3/046 |
| 2018/0129324 A1 * | 5/2018 | Soh | G06F 3/04847 |

(Continued)

FOREIGN PATENT DOCUMENTS

| | | |
|---|---|---|
| CN | 111679760 | 9/2020 |
| KR | 10-2016-0089015 | 7/2016 |
| KR | 10-2307692 | 10/2021 |

*Primary Examiner* — Jason M Mandeville
(74) *Attorney, Agent, or Firm* — F. CHAU & ASSOCIATES, LLC (57) ABSTRACT

Provided is a display device which may include a display panel having an active region in which a plurality of pixels are arranged and a peripheral region, and a sensor layer disposed on the display panel. The sensor layer may include a first sensing electrode including a plurality of first sensing patterns and bridge patterns configured to connect the plurality of first sensing patterns, a second sensing electrode including a plurality of sensing portions and connection portions disposed between the plurality of sensing portions, a plurality of coils each disposed under the plurality of first sensing patterns and the plurality of sensing portions.

16 Claims, 7 Drawing Sheets

(56) References Cited

U.S. PATENT DOCUMENTS

2020/0089345 A1    3/2020  Fleck et al.
2021/0223892 A1*  7/2021  Hwang .................. H10K 59/40

* cited by examiner

DISPLAY DEVICE

CROSS-REFERENCE TO RELATED APPLICATIONS

This U.S. non-provisional patent application claims priority under 35 U.S.C. § 119 of Korean Patent Application No. 10-2022-0091809, filed on Jul. 25, 2022, the entire contents of which are hereby incorporated by reference.

BACKGROUND

The present disclosure herein relates to a display device, and more particularly, to a display device having a sensor layer including a high pass filter.

Multimedia electronic apparatuses such as televisions, mobile phones, tablet computers, navigation systems, and game consoles may have a display device for displaying images and an input sensing device for sensing an external input. Especially, recent electronic apparatuses have a function of sensing a user's fingerprint.

SUMMARY

The present disclosure provides a display device that has a sensor layer including a high pass filter.

An embodiment of the present disclosure provides a display device including a display panel having an active region in which a plurality of pixels are arranged and a peripheral region; and a sensor layer disposed on the display panel, wherein the sensor layer include: a first sensing electrode including a plurality of first sensing patterns and a plurality of bridge patterns, each bridge pattern of the plurality of bridge patterns connecting corresponding two adjacent first sending patterns of the plurality of first sensing patterns; a second sensing electrode including a plurality of sensing portions and a plurality of connection portions, each connection portion of the plurality of connection portions disposed between corresponding two adjacent sensing portions of the plurality of sensing portions, a plurality of coils each disposed under a corresponding one of the plurality of first sensing patterns and the plurality of sensing portions.

In an embodiment, the plurality of coils may each have an inner-side end and an outer-side end, and the plurality of coils may each have the spiral shape extending from the inner-side end to the outer-side end.

In an embodiment, the outer-side end of each of the plurality of coils may be connected to a voltage applying line, and the plurality of coils may each receive a power supply voltage from the voltage applying line.

In an embodiment, the voltage applying line may not overlap the plurality of bridge patterns.

In an embodiment, the sensor layer may further include a base insulation layer disposed on the display panel, and the plurality of bridge patterns and the plurality of coils may be disposed on the base insulation layer.

In an embodiment, the sensor layer may further include an intermediate insulation layer disposed on the base insulation layer and covering the plurality of bridge patterns and the plurality of coils, and the plurality of first sensing patterns, the plurality of sensing portions, and the plurality of connection portions may be disposed on the intermediate insulating layer.

In an embodiment, a plurality of contact holes may be formed in the intermediate insulation layer, and the plurality of first sensing patterns and the plurality of sensing portions may electrically be connected, via the plurality of contact holes, to the plurality of coils, respectively.

In an embodiment, the plurality of contact holes may overlap inner-side ends of the plurality of coils, respectively.

In an embodiment, the plurality of bridge patterns and the plurality of connection portions may be insulated from each other, and each bridge pattern of the plurality of bridge patterns crosses a corresponding connection portion of the plurality of connection portions.

In an embodiment, the plurality of coils may each have a width selected from a range of about 10 μm to about 15 μm.

In an embodiment, the plurality of coils may each include a coil wire of which a number of turns is selected from a range of about 10 to about 99.

In an embodiment, a gap between a first portion of a nth-turn wire of the coil wire and a second portion of an (n+1)-th-turn wire of the coil wire may be equal to a width of a light-emitting area defined in one pixel of the plurality of pixels.

In an embodiment, the plurality of first sensing patterns and the plurality of sensing portions may each have a width selected from a range of about 3 mm to about 5 mm.

In an embodiment, the first sensing electrode and the second sensing electrode may each include a high pass filter (HPF) circuit.

In an embodiment, the high pass filter (HPF) circuit may have a bandwidth selected from a range of about 350 KHz to about 100 MHz.

An embodiment of the present disclosure provides a display device including: a display panel; and a sensor layer disposed on the display panel, and including a voltage applying line, a plurality of coils connected to a power supply voltage via the voltage applying line, and a first sensing electrode and a second sensing electrode electrically connected to the plurality of coils, wherein the first sensing electrode and the second sensing electrode each include a high pass filter (HPF).

In an embodiment, the first sensing electrode may include a plurality of first sensing patterns and a plurality of bridge patterns, each bridge pattern of the plurality of bridge patterns connecting corresponding two adjacent first sensing patterns of the plurality of first sensing patterns, the second sensing electrode may include a plurality of sensing portions and a plurality of connection portions, each connection portion of the plurality of connection portions disposed between corresponding two sensing portions of the plurality of sensing portions. The plurality of coils each may be disposed under a corresponding one of the plurality of first sensing patterns and the plurality of sensing portions.

In an embodiment, the sensor layer may include a base insulation layer disposed on the display panel, and an intermediate insulation layer disposed on the base insulation layer covering the bridge patterns and the plurality of coils, and having a plurality of contact holes defined therein, and the plurality of first sensing patterns and the plurality of sensing portions may be electrically connected, via the plurality of contact holes, to the plurality of coils, respectively.

In an embodiment, the voltage applying line may not overlap the plurality of bridge patterns.

In an embodiment, the plurality of coils may each have a spiral shape extending from an inner-side end to an outer-side end, and may each coil of the plurality of coils include a coil wire of which a number of turns is selected from a range of about 10 to about 99.

BRIEF DESCRIPTION OF THE FIGURES

The accompanying drawings are included to provide a further understanding of the present disclosure, and are incorporated in and constitute a part of this specification. The drawings illustrate embodiments of the present disclosure and, together with the description, serve to explain principles of the present disclosure. In the drawings.

DETAILED DESCRIPTION

In this specification, when a component (or region, layer, portion, etc.) is referred to as "being on", "being connected to", or "being coupled to" another component, it may be directly disposed/connected/coupled to another component, or an intervening third component may also be disposed therebetween.

Like numbers or symbols refer to like components throughout the specification. In addition, in the drawings, the thicknesses, ratios, and dimensions of components are exaggerated for effective description of technical content. "And/or" includes all combinations of one or more that the associated components may define.

Terms such as first and second may be used to describe various components, but these components should not be limited by the terms. These terms are only used for the purpose of distinguishing one component from another components. For example, without departing from the scope of the present invention, a first component may be referred to as a second component, and similarly, a second component may be referred to as a first component. Singular expressions include plural expressions unless the context clearly indicates otherwise.

In addition, terms such as "below", "on lower side", "above", and "on upper side" may be used to describe the relationships of the components as illustrated in the drawings. The terms have relative concepts and are described on the basis of the directions indicated in the drawings.

It will be understood that the term "includes" or "comprises", when used in this specification, specifies the presence of stated features, integers, steps, operations, elements, components, or a combination thereof, but does not preclude the presence or addition of one or more other features, integers, steps, operations, elements, components, or combinations thereof.

Unless otherwise defined, all terms (including technical and scientific terms) used herein have the same meaning as commonly understood by one of ordinary skill in the art to which the present disclosure belongs. Also, terms, such as those defined in commonly used dictionaries, should be interpreted as having a meaning that is consistent with their meaning in the context of the relevant art and should not be interpreted in an idealized or overly formal sense unless expressly so defined herein.

Hereinafter, embodiments of the present disclosure will be described with reference to the drawings.

Figure 1A:
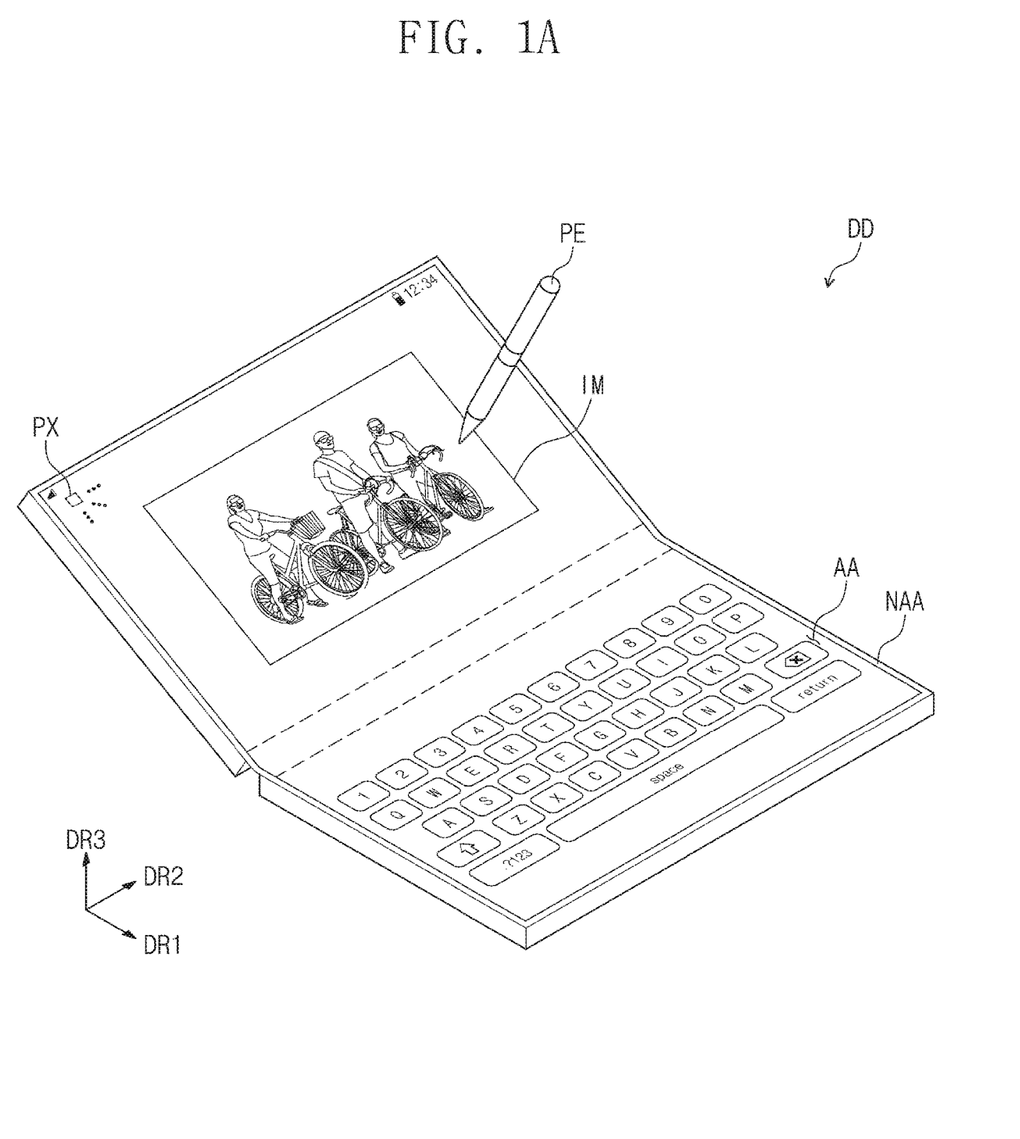
FIG. 1A is a perspective view of a display device according to an embodiment of the present disclosure.
Figure 1B:
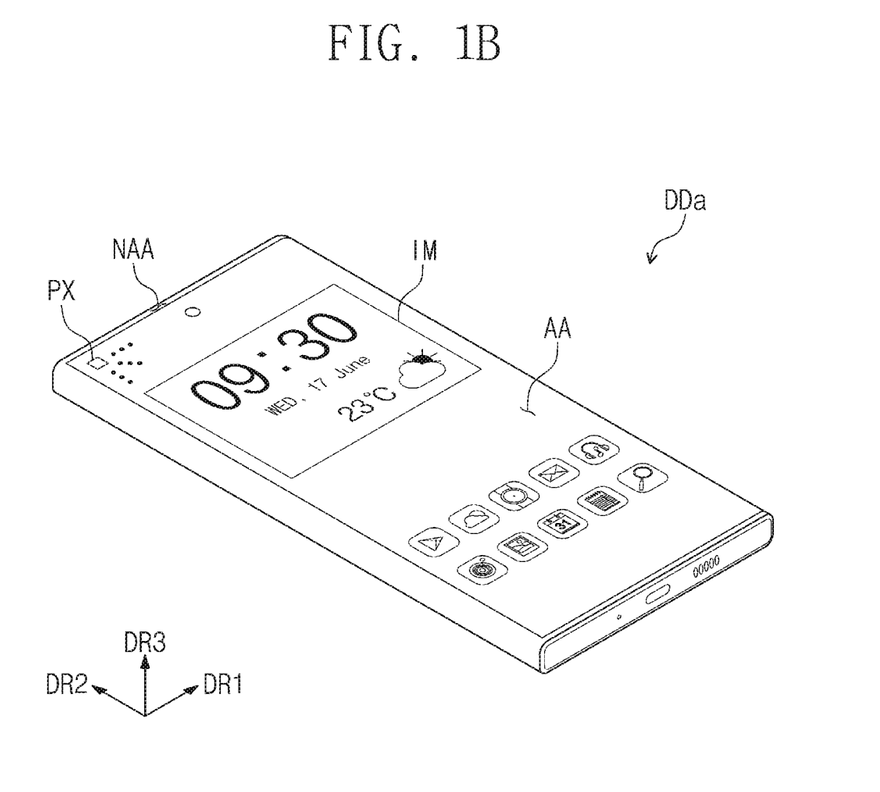
FIG. 1B is a perspective view of a display device according to an embodiment of the present disclosure.

FIG. 1A is a perspective view of a display device DD according to an embodiment of the present disclosure. FIG. 1B is a perspective view of a display device DDa according to an embodiment of the present disclosure.

Referring to FIGS. 1A and 1B, the display device DD or DDa may be a device that is activated in response to an electrical signal. For example, the display device DD or DDa may be a medium- and large-sized display device that is used in a television, a monitor, an external billboard, or an automobile. Embodiments of the present disclosure are not limited thereto, and the display device DD or DDa may be a display device that is used in small- and medium-sized electronic device such as a tablet PC, a personal computer, a laptop computer, a personal digital terminal, a game console, a portable electronic device, and a camera. In addition, these are merely presented as examples, and the display device DD or DDa may also be employed in other electronic devices without departing from the present disclosure. The display device DD of a foldable laptop computer is exemplarily illustrated in FIG. 1A, and the display device DDa of a mobile phone is exemplarily illustrated in FIG. 1B.

An active region AA and a peripheral region NAA may be defined in the display device DD or DDa. The active region AA is the region in which a plurality of pixels PX are arranged and an image IM may be displayed. The active region AA may have a plane defined by a first direction DR1 and a second direction DR2. Although FIGS. 1A and 1B exemplarily illustrate that the active region AA has a rectangular shape, the shape of the active region AA may variously be modified according to the shape of the display device DD or DDa.

The peripheral region NAA may be the region in which an image IM is not displayed. In an embodiment, the peripheral region NAA may surround the active region AA. However, an embodiment of the present disclosure is not limited thereto. The peripheral region NAA may be disposed on one side of the active region AA or may be omitted.

A thickness direction of the display device DD or DDa may be parallel to a third direction DR3 crossing the first direction DR1 and the second direction DR2. Therefore, a front surface (or a top surface) and a back surface (or a bottom surface) of each member which constitutes the display device DD may be defined based on the third direction DR3.

The display device DD or DDa may detect an input by the body of a user (for example, at least one finger) or an input by an input device PE. However, the input device is not limited thereto, and may refer to devices other than the body of user. For example, the input device PE may be an active pen, a stylus pen, a touch pen or an electronic pen. The input using by the body of a user may include various external inputs such as touch, heat, and pressure, applied by a part of the body.

Although FIG. 1A exemplarily illustrates a foldable display device DD and FIG. 1B exemplarily illustrates as a bar-typed display device DDa, embodiments of the present disclosure are not limited thereto. For example, the following description may be applied to various display devices such as a rollable display device and a slidable display device.

Figure 2:
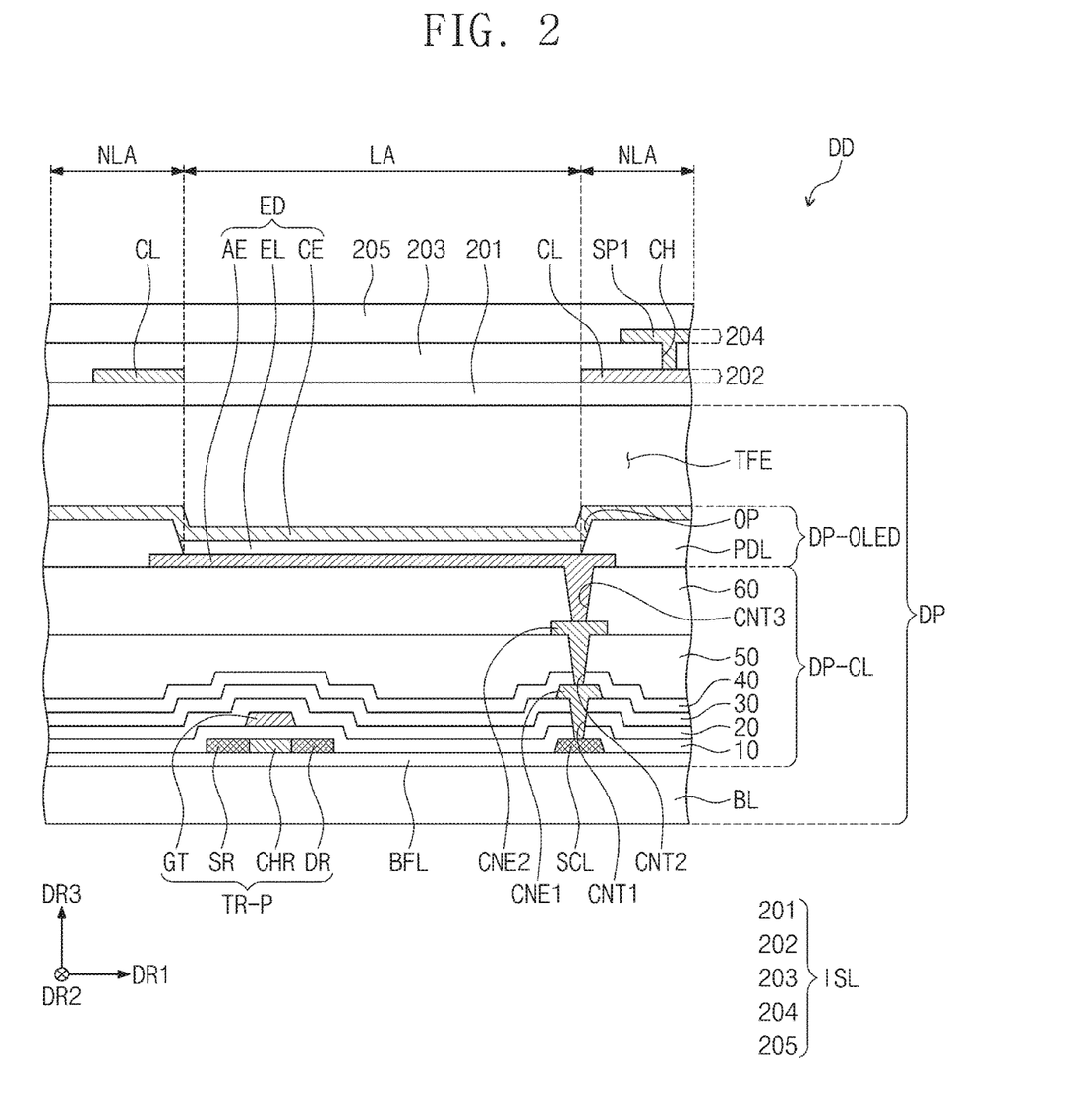
FIG. 2 is a cross-sectional view of a display device according to an embodiment of the present disclosure.

FIG. 2 is a cross-sectional view of a display device according to an embodiment of the present disclosure.

Referring to FIG. 2, the display device DD may include a display panel DP and a sensor layer ISL disposed on the display panel DP. The display panel DP may include a base layer BL, a circuit element layer DP-CL, a display element layer DP-OLED, and an encapsulation layer TFE.

The base layer BL may provide a base surface on which a circuit element layer DP-CL is disposed. The base layer BL may be a rigid substrate or a flexible substrate capable of bending, folding, rolling, or the like. The base layer BL may be a glass substrate, a metal substrate or a polymer substrate, etc. However, an embodiment of the present disclosure is not limited thereto, and the base layer BL may include an inorganic layer, an organic layer, or a composite material layer.

The base layer BL may have multi-layer structure. For example, the base layer BL may include a first synthetic resin layer, a multi- or single-layered inorganic layer, and a second synthetic resin layer disposed on the multi- or single-layered inorganic layer. The first synthetic resin layer and the second synthetic resin layer may each include a polyimide-based resin, and is not particularly limited.

The circuit element layer DP-CL may be disposed on the base layer BL. The circuit element layer DP-CL may include an insulation layer, semiconductor patterns, conductive patterns, and signal lines, etc. The insulation layer, the semiconductor layer, and the conductive layer may be formed on the base layer BL through coating, deposition, etc., and afterwards, the insulation layer, the semiconductor layer, and the conductive layer may be selectively patterned by performing a photolithography process multiple times. After patterning, the semiconductor patterns, the conductive patterns, and the signal lines, which are included in the circuit element layer DP-CL, may be formed.

At least one inorganic layer may be disposed on an upper surface of the base layer BL. The inorganic layer may include or may be formed of at least one of aluminum oxide, titanium oxide, silicon oxide, silicon oxynitride, zirconium oxide, and hafnium oxide. The inorganic layer may have a multi-layer structure. The multi-layered inorganic layer may constitute a barrier layer and/or a buffer layer. In this embodiment, the buffer layer BFL is exemplarily illustrated to be formed on the base layer BL.

The buffer layer BFL may enhance an adhesion force between the base layer BL and the semiconductor patterns by preventing metal atoms or impurities from diffusing from the base layer BL into the semiconductor patterns. The buffer layer BFL may include a silicon oxide layer and a silicon nitride layer, and the silicon oxide layer and the silicon nitride layer may be alternately stacked.

The semiconductor patterns may be disposed on the buffer layer BFL. The semiconductor patterns may include or may be formed of polysilicon, but an embodiment of the present disclosure is not limited thereto. The semiconductor patterns may include or may be formed of amorphous silicon or metal oxide.

FIG. 2 illustrates only some of the semiconductor patterns, and the semiconductor patterns may be further disposed in another region. The semiconductor patterns may be arranged across a plurality of pixel PX (see FIG. 1A) according to a specific rule. The semiconductor patterns may have different electrical properties depending on whether being doped or not. The semiconductor patterns may include a first region of high conductivity and a second region of low conductivity. The first region may be doped with an n-type dopant or a p-type dopant. A p-type transistor may include a doping region doped with the p-type dopant, and an n-type transistor may include a doping region doped with the n-type dopant. The second region of the semiconductor pattern may be an undoped region or a region doped with the lower concentration than that of the first region.

The conductivity of the first region is higher than that of the second region, and the first region may substantially serve as an electrode or a signal line. The second region may substantially correspond to an active region (or a channel). In other words, one portion of the semiconductor pattern may be the active region of a transistor and, another portion thereof may be a source or a drain of the transistor and, still another portion thereof may a connection electrode or connection signal line.

Each of the plurality of pixels PX (see FIG. 1A) may have an equivalent circuit including seven transistors, one capacitor and a light-emitting element. In some embodiments, the equivalent circuit diagram of the pixel may be modified to various form. FIG. 2 exemplarily illustrates one transistor TR-P and the light-emitting element ED, which are included in the pixel PX.

A source region SR (or source), a channel region CHR (or active region), and a drain region of the transistor TR-P may be formed from the semiconductor pattern. On the cross section, the source region SR and the drain region may extend in the opposite directions from the channel region. FIG. 2 exemplarily illustrates a portion of a signal line SCL disposed on the layer same as a layer on which the semiconductor pattern is disposed. Although not separately illustrated, the signal line SCL may be electrically connected to the transistor TR-P on a plane.

A first insulation layer 10 may be disposed on the buffer layer BFL. The first insulation layer 10 may overlap the plurality of pixels PX (see FIG. 2) and cover the semiconductor patterns. The first insulation layer 10 may include or may be an inorganic layer and/or an organic layer, and have a single-layer or multi-layer structure. The first insulation layer 10 may include or may be formed of at least one of aluminum oxide, titanium oxide, silicon oxide, silicon oxynitride, zirconium oxide, and hafnium oxide. In this embodiment, the first insulation layer 10 may be a single-layered silicon oxide layer. Not only the first insulation layer 10 but also the circuit element layer DP-CL to be described later may be an inorganic layer and/or an organic layer, and have a single-layer or multi-layer structure. The inorganic layer includes or is formed of at least one of the above-described materials, but an embodiment of the present disclosure is not limited thereto.

The gate GE of the transistor TR-P is disposed on the first insulation layer 10. The gate GE may be a portion of metal patterns. The gate GE overlaps the channel region CHR. The gate GE may function as a mask in doping process of the semiconductor pattern. The gate GE may include or may be formed of titanium (Ti), silver (Ag), Ag-containing alloy, molybdenum (Mo), Mo-containing alloy, aluminum (Al), Al-containing alloy, aluminum nitride (AlN), tungsten (W), tungsten nitride (WN), copper (Cu), indium tin oxide (ITO), or indium zinc oxide (IZO), but an embodiment of the present disclosure is not limited thereto.

A second insulation layer 20 may be disposed on the first insulation layer 10 and may overlap the gate GE. The second insulation layer 20 may overlap the plurality of pixels. The second insulation layer 20 may be an inorganic layer and/or the organic layer and may have the structure of single- or multi layered structure. A third insulation layer 30 may be disposed on the second insulation layer 20.

A first connection electrode CNE1 may be disposed on the third insulation layer 30. The first connection electrode CNE1 may be connected to the signal line SCL via a contact hole CNT1 that passes through the first to third insulation layers 10, 20 and 30.

A fourth insulation layer 40 may be disposed on the third insulation layer 30, and may cover the first connection electrode CNE1. A fifth insulation layer 50 may be disposed on the fourth insulation layer 40. The fifth insulation layer 50 may be an organic layer.

A second connection electrode CNE2 may be disposed on the fifth insulation layer 50. The second connection electrode CNE2 may be connected to the first connection electrode CNE1 via a contact hole CNT2 that passes through the fourth insulation layer 40 and the fifth insulation layer 50.

A sixth insulation layer 60 may be disposed on the fifth insulation layer 50, and may cover the second connection electrode CNE2. The sixth insulation layer 60 may be an organic layer.

The display element layer DP-OLED may be disposed on the circuit element layer DP-CL. The display element layer DP-OLED may include a light-emitting element ED and a pixel-defining film PDL. For example, the display element layer DP-OLED may include or may be formed of an organic light-emitting material, quantum dots, quantum rods, a micro-LED, or nano-LED. The light-emitting element ED may include a first electrode AE, a light-emitting layer EL, and a second electrode CE.

The first electrode AE may be disposed on the sixth insulation layer 60. The first electrode AE may be a translucent electrode, a transparent electrode, or a reflective electrode. The first electrode AE may be connected to the second connection electrode CNE2 via a contact hole CNT3 that passes through the sixth insulation layer 60.

The pixel-defining film PDL may be disposed on the sixth insulation layer 60, and may cover a portion of the first electrode AE. An opening OP which exposes a portion of the first electrode AE may be defined in the pixel-defining film PDL. In this embodiment, a light-emitting area LA is defined to correspond to a partial region of the first electrode AE exposed by the opening OP of the pixel pixel defining film PDL. The non-light-emitting area NLA may surround the light-emitting area LA.

According to an embodiment, the pixel-defining film PDL may have a light-absorbing property, and may have black color. The pixel-defining film PDL may include or may be formed of a black coloring agent. The black coloring agent may include a black dye or a black pigment. The black coloring agent may include or may be formed of a carbon black, metal such as chromium, or an oxide thereof. The pixel-defining film PDL may correspond to a light shielding pattern having a light-shielding property.

The light-emitting layer EL may be disposed on the first electrode AE. The light-emitting layer EL may be disposed in the opening OP of the pixel-defining film PDL. That is, the light-emitting layer EL may be formed separately in the pixels PX (see FIG. 1A). When the light-emitting layers EL are formed separately in each of the pixels, each of the light-emitting layers EL may emit light having at least one color among blue, red and green. However, an embodiment of the present disclosure is not limited thereto, and thus the light-emitting layer EL may be provided by being connected to the pixel PX. In this case, the light-emitting layer EL may emit blue light or white light.

The second electrode CE may be disposed on the light-emitting layer EL. The second electrode CE may have an integral shape, and may be disposed on the plurality of pixels. The second electrode CE may be provided with a common voltage, and may be referred as a common electrode.

Although not illustrated, a hole control layer may be disposed between the first electrode and the light-emitting layer. The hole control layer may be disposed in the light-emitting area LA and the non-light-emitting area. The hole control layer may include a hole transport layer, and may further include a hole injection layer. An electron control layer may be disposed between the light-emitting layer and the second electrode CE. The electron control layer may include an electron transport layer, and may further include an electron injection layer. The hole control layer and the electron layer may be formed in the plurality of pixels PX by using an open mask.

The encapsulation layer TFE may be disposed on the display element layer DP-OLED. The encapsulation layer TFE may protect the display element layer DP-OLED from foreign substances such as moisture, oxygen, and dust particles. The encapsulation layer TFE may include or may be formed of at least one of inorganic layers or at least one of organic layers. An inorganic layer may protect the display element layer DP-OLED from moisture or oxygen, and an organic layer may protect the display element layer DP-OLED from foreign substances such as dust particles. The inorganic layer may include or may be a silicon nitride layer, a silicon oxynitride layer, a silicon oxide layer, a titanium oxide layer, or an aluminum oxide layer. The organic layer may include or may be formed of an acrylic organic layer, but materials of the inorganic layer and the organic layer are not limited to the above-described examples.

The sensor layer ISL may be disposed on the display panel DP. The sensor layer ISL may detect an external input applied from the outside. The sensor layer ISL may acquire information about an external input through changes in mutual capacitance or acquire information about an external input through changes in self-capacitance. The external input may be a user's input. The user's input may include various external inputs such as a part of the user body, light, heat, pen, and pressure.

The sensor layer ISL may be formed directly on the upper surface of the encapsulation layer TFE through a continuous process. In some embodiments, the sensor layer ISL may contact the upper surface of the encapsulation layer TFE. The sensor layer ISL may include a base insulation layer 201, a first conductive layer 202, an intermediate insulation layer 203, a second conductive layer 204, a cover insulation layer 205, and a plurality of coils CL.

The base insulation layer 201 may be disposed on the display panel DP. The first conductive layer 202 may be disposed on the base insulation layer 201. The intermediate insulation layer 203 may be disposed on the first conductive layer 202. The second conductive insulation layer 204 may be disposed on the intermediate insulation layer 203, and the cover insulation layer 205 may be disposed on the second conductive layer 204.

At least one of the intermediate insulation layer 203 and the cover insulation layer 205 may include or may be formed of an inorganic film. The inorganic film may include or may be formed of at least one of aluminum oxide, titanium oxide, silicon oxide, silicon nitride, silicon oxynitride, zirconium oxide, and hafnium oxide.

At least one of the intermediate insulation layer 203 and the cover insulation layer 205 may include or may be formed of an organic film. The organic film may include at least one of an acryl-based resin, a methacryl-based resin, a polyisoprene-based resin, a vinyl-based resin, an epoxy-based resin, a urethane-based resin, a cellulose-based resin, a siloxane-based resin, a polyimide-based resin, a polyamide-based resin, and a perylene-based resin.

The first conductive insulation layer 202 and the second conductive layer 204 may each have a single-layer structure or a multi-layer structure in which layers are stacked along the third direction DR3. A single-layered conductive layer may include or may be a metal layer or a transparent conductive layer. The metal layer may include or may be formed of molybdenum, silver, titanium, copper, aluminum, or an alloy thereof. The transparent conductive layer may include or may be formed of a transparent conductive oxide such as indium tin oxide (ITO), indium zinc oxide (IZO), zinc oxide (ZnO), and indium zinc tin oxide (IZTO). In addition, the transparent conductive layer may include or may be formed of a conductive polymer such as PEDOT, a metal nanowire, and graphene.

The multi-layered conductive layer may include metal layers. For example, the metal layers may have a three-layered structure of titanium/aluminum/titanium. The multi-layered conductive layer may include at least one metal layer or at least one transparent conductive layer. The details of the first sensing electrode SE1 and the second sensing electrode SE2 will be described later.

Figure 3A:
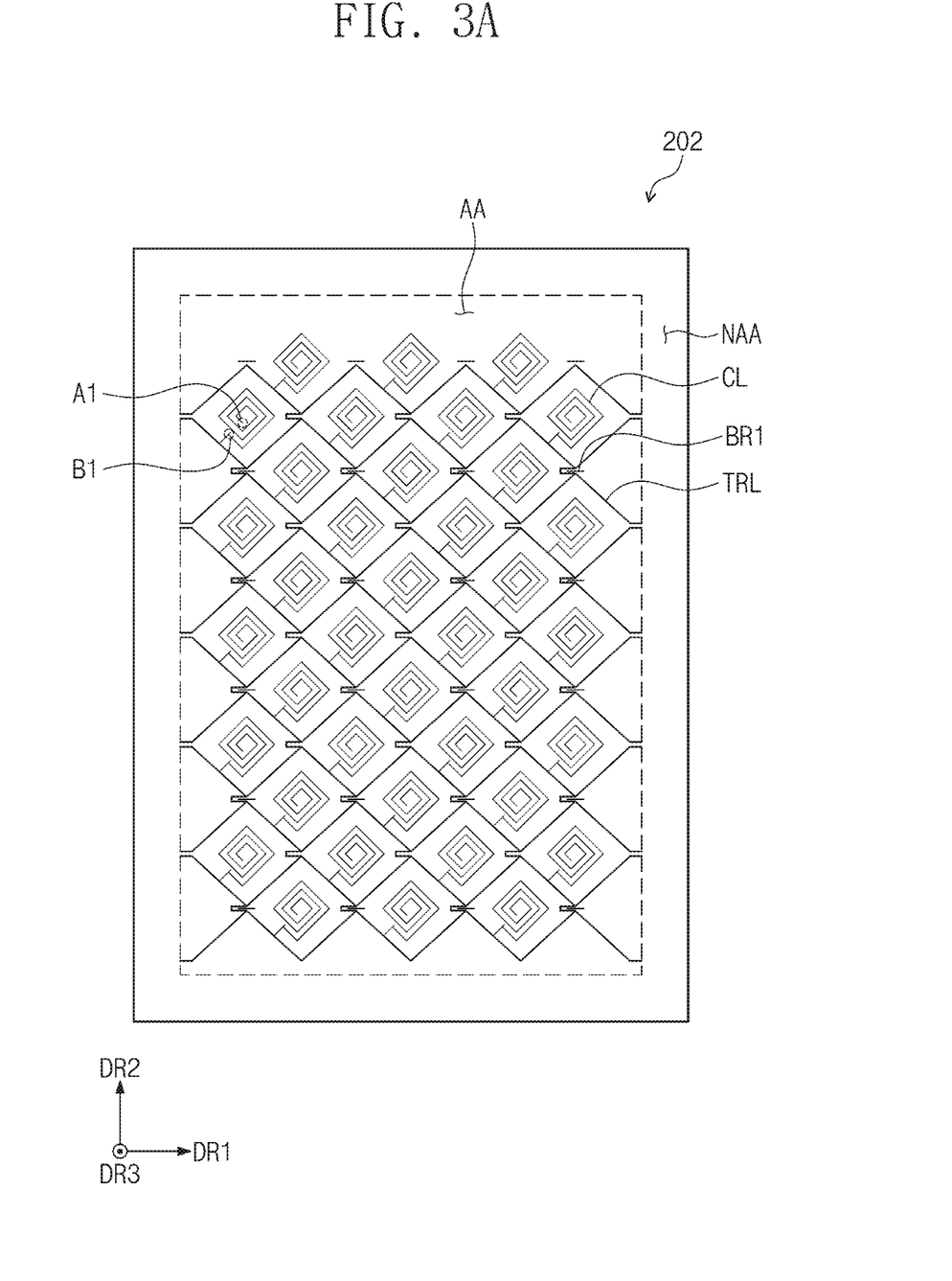
FIG. 3A is a plan view of a first conductive layer according to an embodiment of the present disclosure.
Figure 3B:
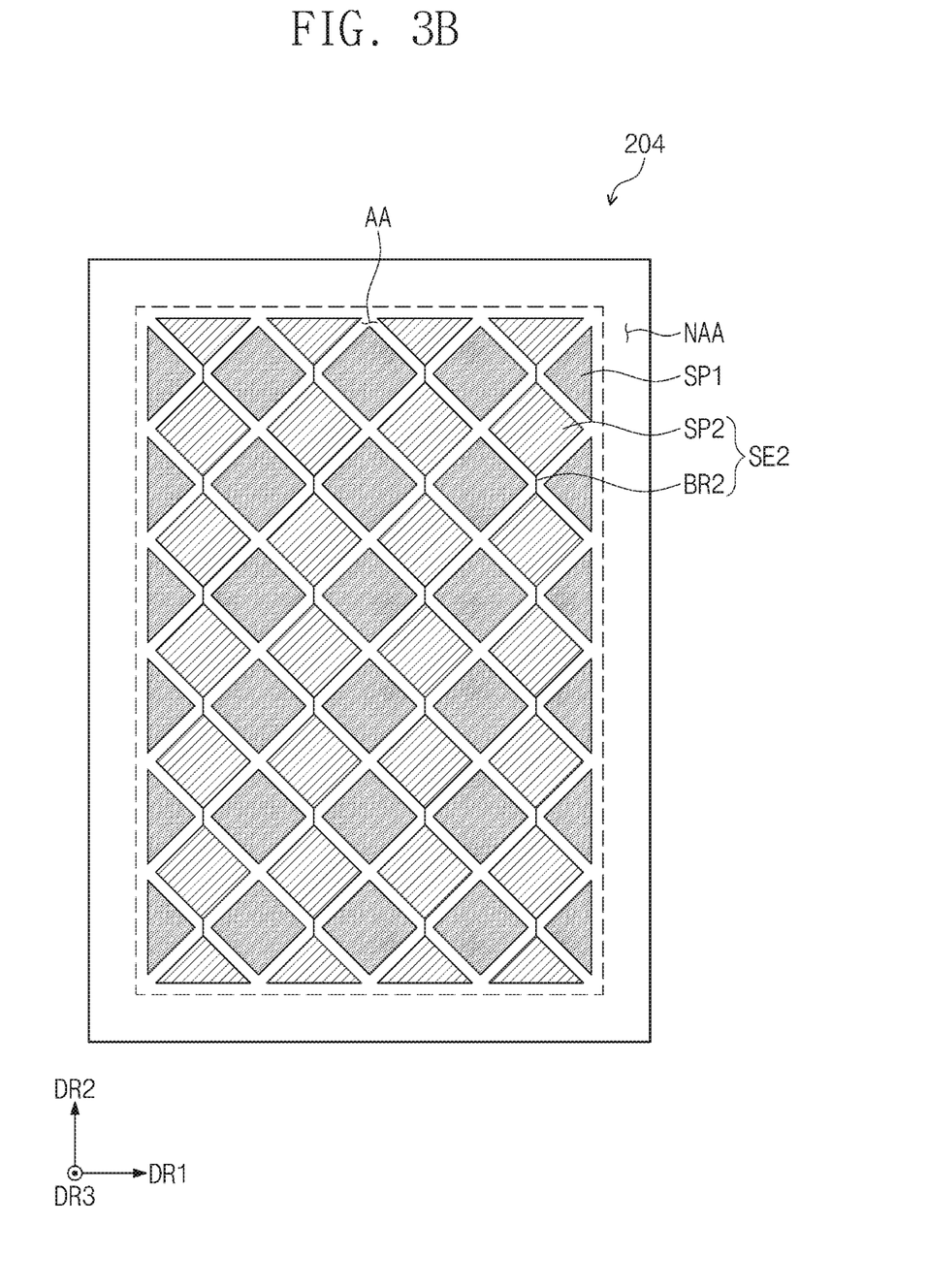
FIG. 3B is a plan view of a second conductive layer according to an embodiment of the present disclosure.

FIG. 3A is a plan view of a first conductive layer 202 according to an embodiment of the present disclosure. FIG. 3B is a plan view of the second conductive layer 204 according to an embodiment of the present disclosure.

Referring to FIG. 2, FIG. 3A and FIG. 3B, the sensor layer ISL may include first sensing electrodes SE1 (see FIG. 5), second sensing electrodes SE2, and a plurality of coils CL.

The first conductive layer 202 may include the plurality of coils CL and some components of the plurality of first sensing electrodes SE1, for example, bridge patterns BR1. The bridge patterns BR1 and the plurality of coils CL may be disposed on the base insulation layer 201, and the intermediate insulation layer 203 may cover the bridge patterns BR1 and the plurality of coils CL.

The second conductive layer 204 may include some components of the plurality of first sensing electrodes SE1, for example, a plurality of sensing patterns SP1, and a plurality of second sensing electrodes SE2. The plurality of first sensing patterns SP1 and the plurality of second sensing electrode SE2 may be disposed on the intermediate insulation layer 203, and the cover insulation layer 205 may cover the plurality of sensing patterns SP1 and the plurality of second sensing electrodes SE2.

Each of the plurality of first sensing electrode SE1 may extend along the first direction DR1, and the first electrodes SE1 may be spaced apart from each other in the second direction DR2. Each of the second electrodes SE2 may extend along the second direction DR2, and the second electrodes SE2 may be spaced apart from each other in the first direction DR1. The sensor layer ISL may acquire an information about an external input through changes in mutual capacitance between the first sensing electrodes SE1 and the second sensing electrodes SE2.

Each of the plurality of first sensing electrodes SE1 may include a plurality of sensing patterns SP1 and bridge patterns BR1. Each of the bridge patterns BR1 may electrically be connected to corresponding two sensing patterns SP1 adjacent to each other among the plurality of first sensing patterns SP1. The plurality of first sensing patterns SP1 and the bridge patterns BR1 may be disposed on different layers. For example, when the bridge patterns BR1 are disposed on the base insulation layer 201 and included in the first conductive layer 202, the plurality of first sensing patterns SP1 may be disposed on the intermediate insulation layer 203 and may be included in the second conductive layer 204.

Although FIG. 3A and FIG. 3B exemplarily illustrate a structure in which one of the bridge patterns BR1 is connected to two of the first sensing patterns SP1, an embodiment of the present disclosure is not limited thereto. For example, two adjacent first sensing patterns SP1 may be connected to each other by multiple bridge patterns BR1, for example two bridge patterns BR1.

Each of the plurality of second sensing electrodes may include a plurality of sensing portions SP2 and connection portions BR2. The connection portions BR2 may be defined as a portion between adjacent sensing portions among the plurality of sensing portions. The plurality of sensing portions SP2 and the connection portions BR2 may be connected to each other to form an integral shape. Therefore, the connection portions BR2 may be defined as portions, of the second sensing electrode SE2, crossing the bridge patterns BR1 of the first sensing electrode SE1. The connection portions BR2 and the bridge patterns BR1 may be disposed on different layers, and may thus be insulated from each other and cross each other.

The plurality of sensing portions SP2 and the connection portions BR2 may be disposed on the same layer, and the plurality of sensing portions SP2 and the connection portions BR2 may be disposed on the same layer as the plurality of first sensing patterns SP1. In other words, the plurality of sensing portions SP2 and the connection portions BR2 may be disposed on the intermediate insulation layer 203, and may be included in the second conductive layer 204.

Each of the plurality of coils CL may be disposed under the plurality of first sensing patterns SP1 and the plurality of sensing portions SP2.

Referring to FIG. 2 and FIG. 3A, the plurality of coils CL may be arranged apart each other in the first direction DR1 and the second direction DR2. The plurality of coils CL may overlap at least a part of the plurality of first sensing pattern SP1 and at least a part of the plurality of sensing portions SP2. For example, the plurality of coils CL may overlap, in one-to-one correspondence, the plurality of first sensing patterns SP1 and the plurality of sensing portions SP2, which are defined in a diamond shape, among the plurality of first sensing electrodes SE1 and the plurality of second sensing electrodes SE2. However, embodiments of the present disclosure are not limit thereto. For example, in an embodiment of this present disclosure, first sensing patterns SP1 and sensing portions SP2, which are disposed adjacent to the peripheral region NAA, among the plurality of first sensing patterns SP1 and the plurality of sensing portions SP2 may be also disposed to overlap the plurality of coils CL. In this case, the shape of the plurality of coils CL, overlapping the plurality of first sensing patterns SP1 and the plurality of sensing portions SP2 which are disposed adjacent the peripheral region NAA, may be correspond to the shape of the plurality of first sensing patterns SP1 and the plurality of sensing portions SP2 which overlap each other.

The plurality of coils CL may each include an inner-side end A1 and an outer-side end B1. The plurality of coils CL may each have a spiral shape extending from the inner-side end A1 to the outer-side end B1.

The outer-side end B1 of each of the plurality of coils CL may be connected to a voltage applying line TRL. The plurality of coils CL may each receive a power supply voltage ELVSS (see FIG. 5) through the voltage applying line TRL. A voltage, which is the same as that of the second electrode CE, may be applied to the plurality of coils CL.

Therefore, a parasitic capacitance between the plurality of coils CL and the second electrode CE may be minimized.

The plurality of coils CL arranged in the first direction DR1 and the second direction DR2 may be electrically connected to the voltage applying line TRL extending in the active region AA. For example, the voltage applying line TRL may extend without overlapping the bridge patterns BR1 and may be connected to the plurality of coils CL. In this case, the size of the plurality of coils CL may be smaller than the size of the plurality of first sensing pattern SP1 (see FIG. 3B) or the plurality of sensing portions SP2 (see FIG. 3B). Therefore, the voltage applying line TRL may be disposed in a space between the bridge patterns BR1 and the plurality of coils CL.

Figure 4:
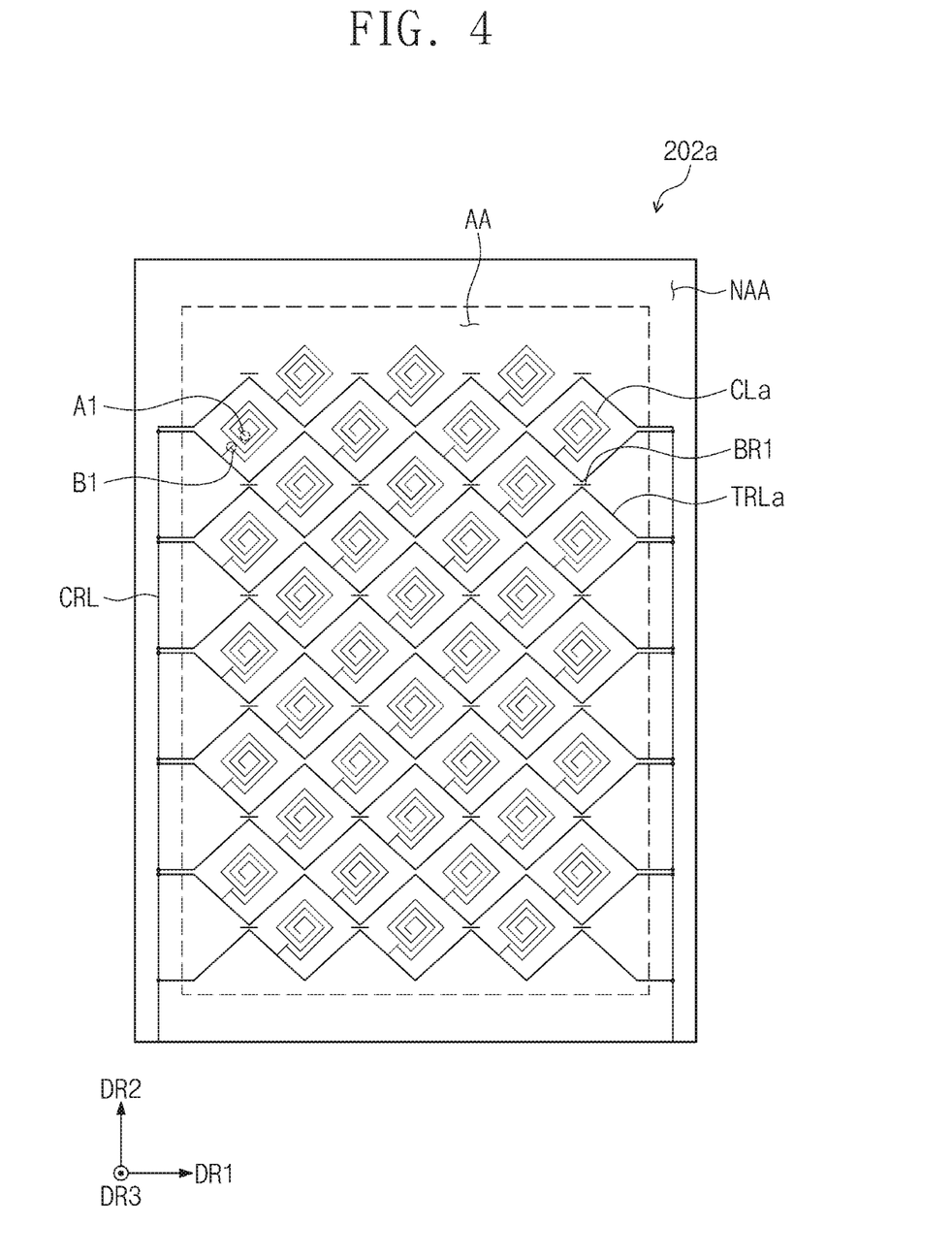
FIG. 4 is a plan view of the first conductive layer according to an embodiment of the present disclosure.

FIG. 4 is a plan view of the first conducive layer 202a according to an embodiment of the present disclosure.

Referring to FIG. 2 and FIG. 4, the first conductive layer 202a may include a plurality of coils CLa, a plurality of voltage applying lines TRLa overlapping the active region AA, a common connection line CRL disposed in the peripheral region NAA and connected to the plurality of voltage applying lines TRLa, and bridge patterns BR1.

The plurality of voltage applying lines TRLa may extend along the first direction DR1, and may be spaced apart from each other in the second direction DR2. The plurality of voltage applying lines TRLa may not overlap the bridge patterns BR1. The plurality of coils CLa may be spaced apart from each other in the first direction DR1 and the second direction DR2. The plurality of voltage applying lines TRLa may be connected to coils, arranged in the first direction DR1, among the plurality of coils CLa.

The outer-side end B1 of each of the plurality of coils CLa may be connected to the voltage applying line TRLa. The plurality of coils CLa in a first row arranged in the first direction DR1 may be connected to one of the voltage applying lines TRLa, and the voltage applying line TRLa extending to the peripheral region NAA may be connected to the common connection lines CRL and connected to the plurality of coils CLa in a second row which is spaced apart from the first row in the second direction DR2.

In an embodiment of the present disclosure, the voltage applying lines TRLa may not be connected with each other in the active region AA. For example, two adjacent voltage applying lines, in the second direction DR2, of the voltage applying lines TRLa may not be connected with each other unlike two adjacent voltage applying lines, in the second direction DR2, of the voltage applying lines TRL of FIG. 3A. This is because the size of the plurality of coils CLa is bigger than the size of the plurality of coils CL as illustrated in FIG. 3A, and thus the plurality of voltage applying lines TRLa in FIG. 4 may not extend between the bridge patterns BR1 and the plurality of coils CLa.

Figure 5:
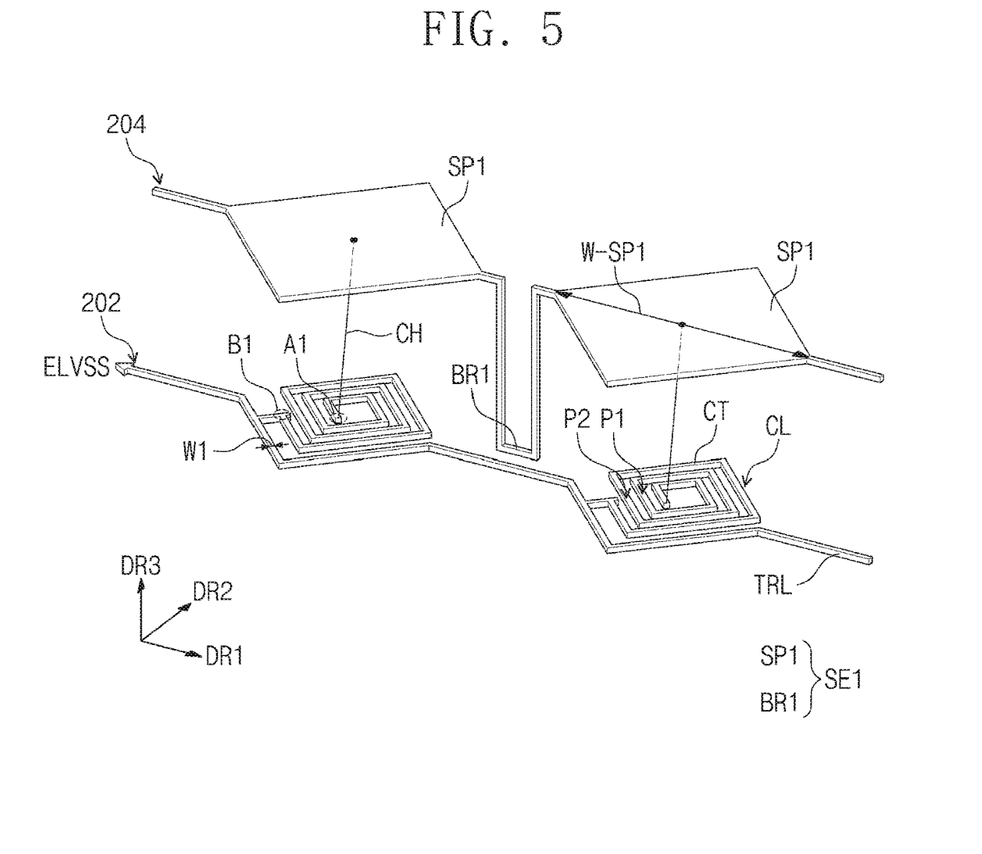
FIG. 5 is a perspective view showing a portion of a sensor layer according to an embodiment of the present disclosure.

FIG. 5 is a perspective view illustrating a portion of a sensor layer ISL (see FIG. 2) according to an embodiment of the present disclosure. FIG. 5 illustrates a portion of the first sensing electrode SE1 and a portion of the plurality of coils CL corresponding to the first sensing electrode SE1.

Referring to FIG. 2 and FIG. 5, a plurality of contact holes CH may be defined in the intermediate insulation layer 203. The plurality of first sensing patterns SP1 may be electrically connected via a plurality of contact holes CH to the plurality of coils CL, respectively. The plurality of contact holes CH connected to the plurality of first sensing patterns SP1 may respectively overlap the inner-side ends A1 of the plurality of coils CL. Although not illustrated, the plurality of sensing portions SP2 (see FIG. 4) may also be electrically connected via the plurality of contact holes CH to the plurality of coils CL, respectively. Likewise, the plurality of contact holes CH connected to the plurality sensing portions SP2 may respectively overlap the inner-side ends A1 of the plurality of coils CL.

The plurality of coils CL may be disposed on the base insulation layer 201 which does not overlap the bridge patterns BR1. Therefore, the plurality of coils CL may each have a width W1 of about 10 μm to about 15 μm. Additionally, each of the plurality of coils CL may vertically overlap a corresponding one of the plurality of first sensing patterns SP1 and the plurality of sensing portions SP2, and may be disposed under the corresponding thereof. The plurality of first sensing patterns SP1 and the plurality of sensing portions SP2 may each have a width W-SP1 of about 3 mm to about 5 mm.

FIG. 5 illustrates that each of the plurality of coils has a coil wire CT of which a number of turns is 3, but embodiments of the present disclosure are not limited hereto. For example, each of the plurality of coils CL may include a coil wire CT of which a number of turns is about 10 to about 99.

A gap between a first portion P1 of an nth-turn wire of the coil wire CT and a second portion P2 of an (n+1)-th-turn wire of the coil wire CT may be equal to a width of a light-emitting area LA (see FIG. 2) defined in one pixel PX of the plurality of pixels PX. In other word, the coil wire CT may be disposed not to overlap the light-emitting area LA. FIG. 5 exemplarily illustrates a gap between the second-turn wire and the third-turn wire.

Figure 6:
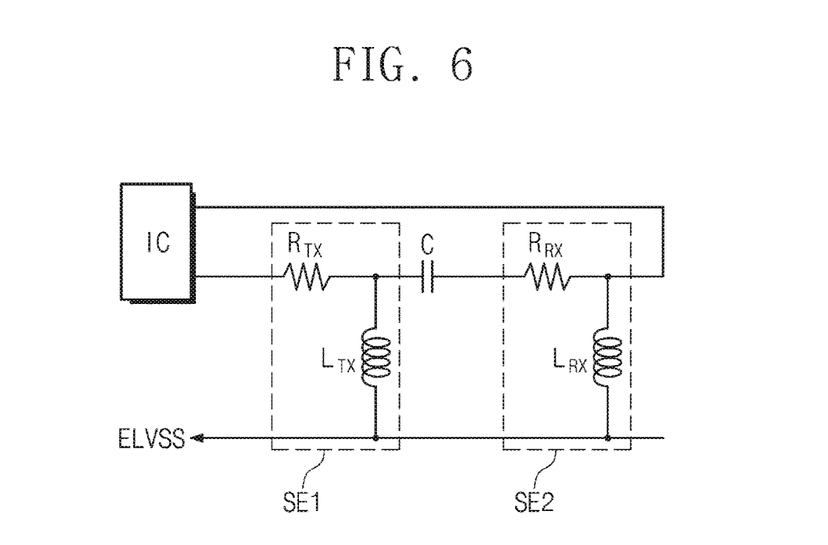
FIG. 6 is an equivalent circuit diagram of a sensor layer according to an embodiment of the present disclosure.

FIG. 6 is an equivalent circuit diagram of a sensor layer ISL (see FIG. 2) according to an embodiment of the present disclosure.

Referring to FIG. 2 and FIG. 6, the first sensing electrode SE1 and the second sensing electrode SE2 may each include a high pass filter (HPF) circuit. A first inductor $L_{TX}$ and a second inductor $L_{RX}$ corresponding to the plurality of coils CL (see FIG. 5) may be connected to a power supply voltage ELVSS. The power supply voltage ELVSS is equal to a voltage applied to the second electrode CE.

The first sensing electrode SE1 may be a transmitting electrode, and the second sensing electrode SE2 may be a receiving electrode. A driver IC may sense whether touch is applied or not according to changes in mutual capacitance between the first sensing electrode SE1 and the second sensing electrode SE2.

The first sensing electrode SE1 may have an equivalent circuit including a first resister $R_{TX}$ and the first inductor $L_{TX}$. The second sensing electrode SE2 may have an equivalent circuit including a second resister $R_{RX}$ and the second inductor $L_{RX}$. The first inductor $L_{TX}$ may be coils CL connected to the first sensing electrode SE1, and the second inductor $L_{RX}$ may be coils CL connected to the second sensing electrode SE2.

According to an embodiment of the present disclosure, the first sensing electrode SE1 may include a high pass filter including a first resister $R_{TX}$ and the first inductor $L_{TX}$, and the second sensing electrode SE2 may include a high pass filter including a second resister $R_{RX}$ and the second inductor $L_{RX}$.

When the plurality of coils CL are not disposed under the first and second sensing electrodes SE1 and SE2, a base capacitance may be formed between the second electrode CE and the first and second sensing electrodes SE1 and SE2. In other words, the first and second sensing electrodes SE1 and SE2 according to comparative examples may have a transmission line structure of low pass filter. In this case, as the gap between the second electrode CE and the sensor layer ISL becomes narrower and the base capacitance becomes greater, the bandwidth of the low pass filter may be narrower. Therefore, it may not be easy to secure a bandwidth to avoid noise.

According to an embodiment of the present disclosure, the plurality of coils CL are disposed under the first sensing electrodes SE1 and the second sensing electrodes SE2, and are electrically connected to the first sensing electrodes SE1 and the second sensing electrodes SE2. Therefore, each of the first sensing electrodes SE1 and the second sensing electrodes SE2 may have a transmission line structure of a high pass filter. According to an embodiment of the present disclosure, a cutoff frequency may be adjusted by adjusting the inductance of the plurality of coils CL. Therefore, the inductances of the first and the second inductors $L_{TX}$ and $L_{RX}$ may be designed so that the high pass filter has a cutoff frequency to avoid low-frequency range noise and to secure a sufficient signal-to-noise ratio. For example, the cutoff frequency may be more than or equal to 350 KHz, and the bandpass width may be about 350 KHz to about 100 MHz.

Additionally, the sensor layer ISL, according to an embodiment of the present disclosure includes the plurality of coils CL, and may thus function as a digitizer. Therefore, it is possible to sense an input of an electronic pen PE (see FIG. 1) even when an additional digitizer other than the sensor layer is not provided. For example, the sensor layer ISL may generate a magnetic field of a resonance frequency that is preset with the electronic pen PE.

The magnetic field is applied to the LC resonance circuit including an inductor (coil) and a capacitor of the electronic pen PE. The coils of the electronic pen PE generate current by the receiving a magnetic field, and transfers the generated current to the capacitor. Accordingly, the capacitor charges the current input from the coil, and discharge the charged current to the coils CL. The magnetic field emitted from the electronic pen PE may be absorbed again by the coils CL of the sensor layer ISL, and it is therefore possible to determine the position of the sensor layer ISL to which the electronic pen PE is adjacent.

When an operation is performed to sense both touch coordinates and coordinates by the electronic pen PE using the sensor layer ISL, the sensor layer ISL may be driven in a time-divisional manner. For example, the sensor layer ISL may operate in a first mode for calculating the coordinates by sensing changes in mutual capacitance between the first sensing electrodes SE1 and the second sensing electrodes SE2, and operate in a second mode for calculating the coordinates of the electronic pen PE on the basis of the magnetic field emitted from the electronic pen PE.

According to the forging description, a first sensing electrode and a second sensing electrode may each have a transmission line structure of a high pass filter (HPF). A blocking frequency of the high pass filter may be adjusted by adjusting the inductance of a plurality of coils. Therefore, a sensor layer may avoid low-frequency noise and thus ensure enough signal-to-noise ratio (SNR).

Additionally, the sensor layer may have the function of a digitizer because of including a plurality of coils. Therefore, it is possible to sense an input of an electronic pen even when an additional digitizer other than the sensor layer is not provided.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display device comprising:
a display panel including an active region in which a plurality of pixels are arranged, and a peripheral region; and
a sensor layer disposed on the display panel,
wherein the sensor layer includes:
a first sensing electrode including a plurality of first sensing patterns arranged in a first straight line extending a first direction and a plurality of bridge patterns, each bridge pattern of the plurality of bridge patterns connecting corresponding two adjacent first sensing patterns of the plurality of first sensing patterns,
a second sensing electrode including a plurality of sensing portions arranged in a second straight line extending in a second direction different from the first direction and a plurality of connection portions, each connection portion of the plurality of connection portions disposed between corresponding two adjacent sensing portions of the plurality of sensing portions,
a plurality of first coils arranged along the first straight line and each of the plurality of first coils disposed under a corresponding one of the plurality of first sensing patterns,
a plurality of second coils each disposed under a corresponding one of the plurality of sensing portions, wherein the plurality of first and second coils each comprise a coil wire with a number of a plurality of turns, wherein, when viewed in a plan view, a light-emitting area defined in one pixel of the plurality of pixels overlaps a region between a first portion of an nth-turn wire of the coil wire and a second portion of an (n+1)-th-turn wire of the coil wire, wherein the plurality of first and second coils each comprise an inner-side end and an outer-side end, and wherein the plurality of first and second coils each have a spiral shape extending from the inner-side end to the outer-side end; and a voltage applying line extending in a zig-zag manner along the first direction, wherein the voltage applying line is connected the outer-side end of each of the plurality of first coils arranged along the first straight line,
wherein the plurality of first and second coils each receive a power supply voltage from the voltage applying line,
wherein the voltage applying line and the plurality of bridge patterns are disposed in a same single conductive layer, and
wherein the voltage applying line, when viewed in the plan view, does not overlap the plurality of bridge patterns.

2. The display device of claim 1,
wherein the sensor layer further comprises a base insulation layer disposed on the display panel, and
wherein the plurality of bridge patterns and the plurality of first and second coils are disposed on the base insulation layer.

3. The display device of claim 2,
wherein the sensor layer further includes an intermediate insulation layer disposed on the base insulation layer and covering the plurality of bridge patterns and the plurality of first and second coils, and wherein the plurality of first sensing patterns, the plurality of sensing portions, and the plurality of connection portions are disposed in the intermediate insulation layer.

4. The display device of claim 3,
wherein a plurality of contact holes are formed in the intermediate insulation layer, and
wherein the plurality of first sensing patterns and the plurality of sensing portions are electrically connected, via the plurality of contact holes, to the plurality of first and second coils, respectively.

5. The display device of claim 4,
wherein the plurality of contact holes overlap inner-side ends of the plurality of first and second coils, respectively.

6. The display device of claim 1,
wherein the plurality of bridge patterns and the plurality of connection portions are insulated from each other, and
wherein each bridge pattern of the plurality of bridge patterns crosses a corresponding connection portion of the plurality of connection portions.

7. The display device of claim 1,
wherein the plurality of first and second coils each have a width selected from a range of about 10 μm to about 15 μm.

8. The display device of claim 1,
wherein the number of the plurality of turns is selected from a range of about 10 to about 99.

9. The display device of claim 8,
wherein a first maximum width, in a first direction, of the region between the first portion of an nth-turn wire of the coil wire and the second portion of an (n+1)-th-turn wire of the coil wire is equal to a second maximum width, in the first direction, of the light-emitting area defined in the one pixel of the plurality of pixels,
wherein the (n+1)-th-turn wire and nth-turn wire are adjacent to each other, and
wherein the first portion and the second portion are adjacent to each other in the first direction.

10. The display device of claim 1,
wherein the plurality of first sensing patterns and the plurality of sensing portions each have a width selected from a range of about 3 mm to about 5 mm.

11. The display device of claim 1,
wherein the first sensing electrode and the second sensing electrode each comprises a high pass filter (HPF) circuit.

12. The display device of claim 11,
wherein the high pass filter (HPF) circuit has a bandwidth selected from a range of about 350 KHz to about 100 MHz.

13. An electronic device comprising:
a display panel including a plurality of pixels; and
a sensor layer disposed on the display panel,
wherein the sensor layer includes:
a voltage applying line extending in a zig-zag manner,
a plurality of coils connected to a power supply voltage via the voltage applying line, and
a first sensing electrode and a second sensing electrode electrically connected to the plurality of coils,
wherein the first sensing electrode and the second sensing electrode each include a high pass filter (HPF),
wherein the plurality of coils each comprise a coil wire with a number of a plurality of turns,
wherein, when viewed in a plan view, a light-emitting area defined in one pixel of the plurality of pixels overlaps a region between a first portion of an nth-turn wire of the coil wire and a second portion of an (n+1)-th-turn wire of the coil wire,
wherein a first maximum width, in a first direction, of the region between the first portion of an nth-turn wire of the coil wire and the second portion of an (n+1)-th-turn wire of the coil wire is equal to a second maximum width, in the first direction, of the light-emitting area defined in the one pixel of the plurality of pixels,
wherein the (n+1)-th-turn wire and nth-turn wire are adjacent to each other,
wherein the first portion and the second portion are adjacent to each other in the first direction,
wherein the first sensing electrode comprises:
a plurality of first sensing patterns and a plurality of bridge patterns, each bridge pattern of the plurality of bridge patterns connecting corresponding two adjacent first sensing patterns of the plurality of first sensing patterns,
wherein the voltage applying line and the plurality of bridge patterns are disposed in a same single conductive layer, and
wherein the voltage applying line, when viewed in the plan view, does not overlap the plurality of bridge patterns.

14. The electronic device of claim 13,
wherein the second sensing electrode comprises:
a plurality of sensing portions and a plurality of connection portions, each connection portion of the plurality of connection portions disposed between corresponding two sensing portions of the plurality of sensing portions, and
wherein the plurality of coils each are disposed under a corresponding one of the plurality of first sensing patterns and the plurality of sensing portions.

15. The electronic device of claim 14,
wherein the sensor layer further comprises:
a base insulation layer disposed on the display panel; and
an intermediate insulation layer disposed on the base insulation layer, covering the plurality of bridge patterns and the plurality of coils, and having a plurality of contact holes defined therein, and
wherein the plurality of first sensing patterns and the plurality of sensing portions are electrically connected, via the plurality of contact holes, to the plurality of coils respectively.

16. The electronic device of claim 13,
wherein the plurality of coils each have a spiral shape extending from an inner-side end to an outer-side end, and
wherein the number of the plurality of turns is selected from a range of about 10 to about 99.

* * * * *